(12) United States Patent
Hu

(10) Patent No.: US 8,908,367 B2
(45) Date of Patent: Dec. 9, 2014

(54) ELECTRONIC DEVICE ENCLOSURE

(71) Applicants: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(72) Inventor: Xu-Quan Hu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 195 days.

(21) Appl. No.: 13/626,989

(22) Filed: Sep. 26, 2012

(65) Prior Publication Data

US 2013/0160384 A1 Jun. 27, 2013

(30) Foreign Application Priority Data

Dec. 27, 2011 (CN) .......................... 2011 1 0443641

(51) Int. Cl.
G06F 1/16 (2006.01)

(52) U.S. Cl.
USPC .................... 361/679.31; 312/223.2; 174/66; 220/241

(58) Field of Classification Search
USPC .................... 361/679.55, 679.31; 312/223.2; 220/241; 174/66
See application file for complete search history.

(56) References Cited

U.S. PATENT DOCUMENTS

| | | | | | |
|---|---|---|---|---|---|
| 5,768,097 | A | * | 6/1998 | Jelinger | 361/679.37 |
| 5,783,777 | A | * | 7/1998 | Kruse et al. | 174/66 |
| 5,986,881 | A | * | 11/1999 | Yang | 361/679.32 |
| 6,102,501 | A | * | 8/2000 | Chen et al. | 312/223.2 |
| 6,188,573 | B1 | * | 2/2001 | Urita | 361/679.48 |
| 6,278,606 | B1 | * | 8/2001 | Schmitt et al. | 361/679.35 |
| 6,373,695 | B1 | * | 4/2002 | Cheng | 361/679.39 |
| 6,390,320 | B2 | * | 5/2002 | Hurst et al. | 220/241 |
| 6,473,297 | B1 | * | 10/2002 | Behl et al. | 361/679.48 |
| 6,590,848 | B1 | * | 7/2003 | Chen | 720/654 |
| 6,711,008 | B2 | * | 3/2004 | Teng et al. | 361/679.02 |
| 6,891,720 | B2 | * | 5/2005 | Voon et al. | 361/679.31 |
| 7,133,290 | B2 | * | 11/2006 | Junkins et al. | 361/726 |
| 7,447,016 | B2 | * | 11/2008 | Tsai et al. | 361/679.33 |
| 7,457,112 | B2 | * | 11/2008 | Fukuda et al. | 361/679.48 |
| 7,529,096 | B2 | * | 5/2009 | Lin et al. | 361/724 |
| 8,052,231 | B2 | * | 11/2011 | Rasmussen et al. | 312/265.6 |
| 8,077,452 | B2 | * | 12/2011 | Wang | 361/679.4 |
| 2008/0024969 | A1 | * | 1/2008 | Sun et al. | 361/683 |

* cited by examiner

Primary Examiner — Lisa Lea Edmonds
(74) Attorney, Agent, or Firm — Novak Druce Connolly Bove + Quigg LLP

(57) ABSTRACT

An electronic device enclosure includes a chassis and a cover. The chassis includes a fixing post and defines a receiving space configured to receive a storage device. The cover defines a latching hole. The fixing post is engaged in the latching hole to engage the cover with the chassis and cover the receiving space when no storage device is in the receiving space.

11 Claims, 5 Drawing Sheets

ELECTRONIC DEVICE ENCLOSURE

BACKGROUND

1. Technical Field

The present disclosure relates to electronic device enclosures, more particularly to an electronic device enclosure with a cover.

2. Description of Related Art

A server system may include a plurality of data storage devices. The storage devices are installed together on a chassis. Any voids created by the removal or absence of one or more of the storage devices can adversely effect heat dissipation of the server system.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
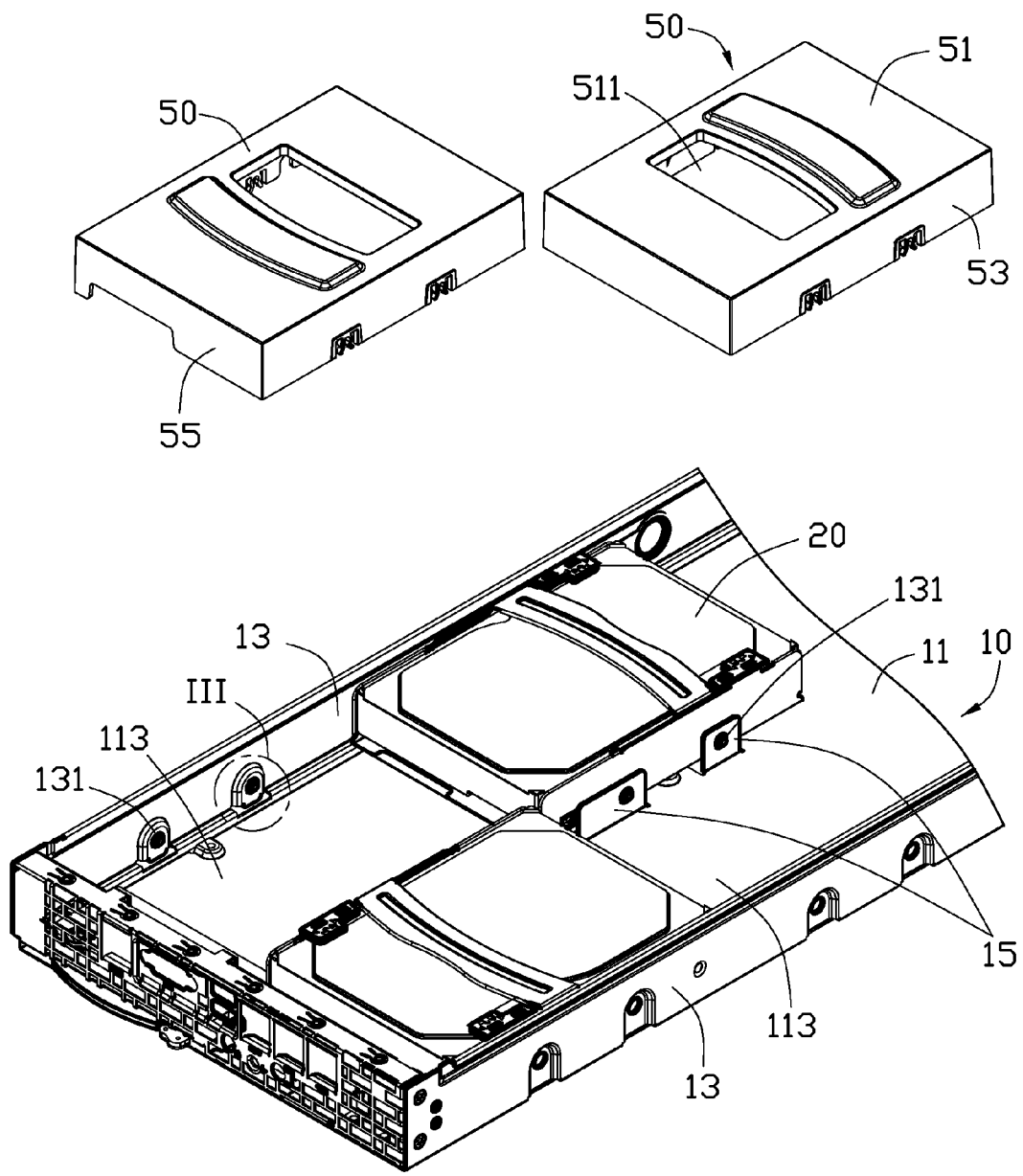
FIG. 1 is an exploded, isometric view of an embodiment of an electronic device enclosure and data storage devices.

FIG. 1 illustrates an electronic device enclosure in accordance with an embodiment. The electronic device enclosure includes a chassis 10 and a plurality of covers 50. In one embodiment, the electronic device is a server system.

The chassis 10 includes a bottom plate 11 and two side plates 13. The two side plates 13 extend from opposite sides of the bottom plate 11. The two side plates 13 are substantially parallel to each other and perpendicular to the bottom plate 11. Two dividing plates 15 are extend from the bottom plate 11 to provide receiving areas for data storage devices. The two dividing plates 15 are in a same plane. The plane is substantially parallel to the two side plates 13 and perpendicular to the bottom plate 11. The two dividing plates 15, each of the side plates 13, and the bottom plate 11 cooperatively define a receiving space 113. The receiving space 113 can receive a storage device 20. The storage device 20 may be a hard disk drive, compact disk read-only memory (CD-ROM) drive, digital video disc (DVD) drive, floppy disk drive, for example. Two fixing posts 131 protrude from each of the two side plates 13 and each of the two dividing plates 15 corresponding to the receiving space 113.

Figure 2:
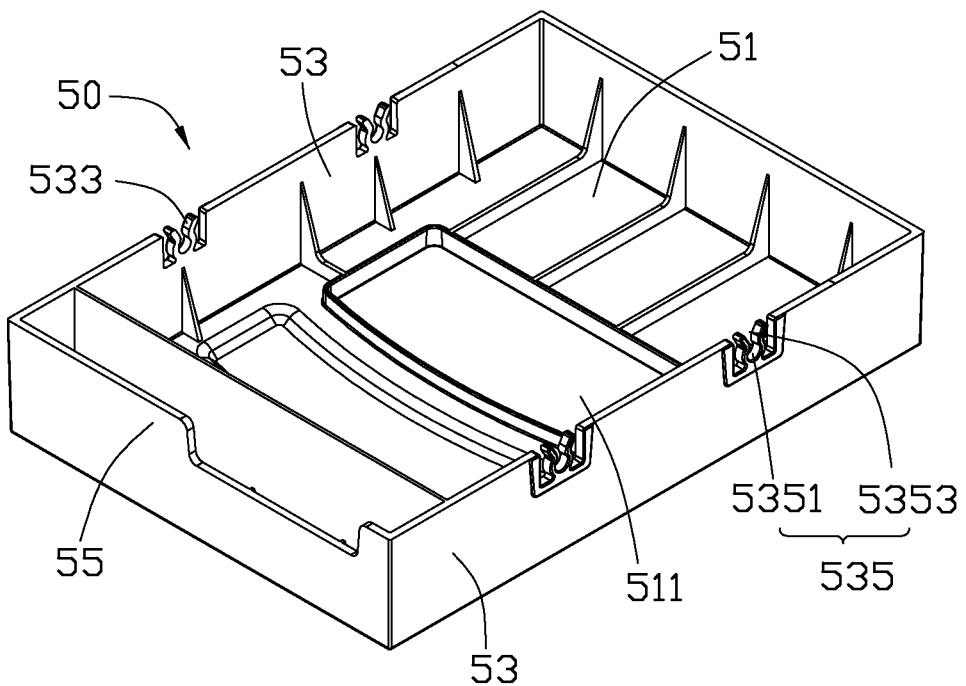
FIG. 2 is an exploded view of a cover of FIG. 1.
Figure 3:
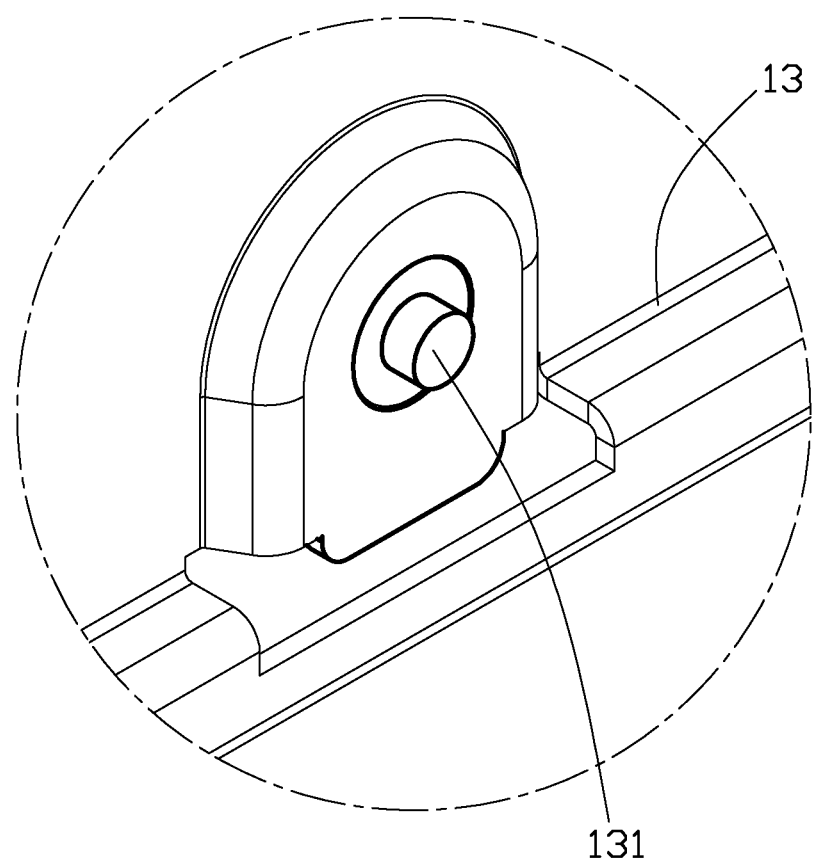
FIG. 3 is an enlarged view of a circled portion III of FIG. 1.
Figure 4:
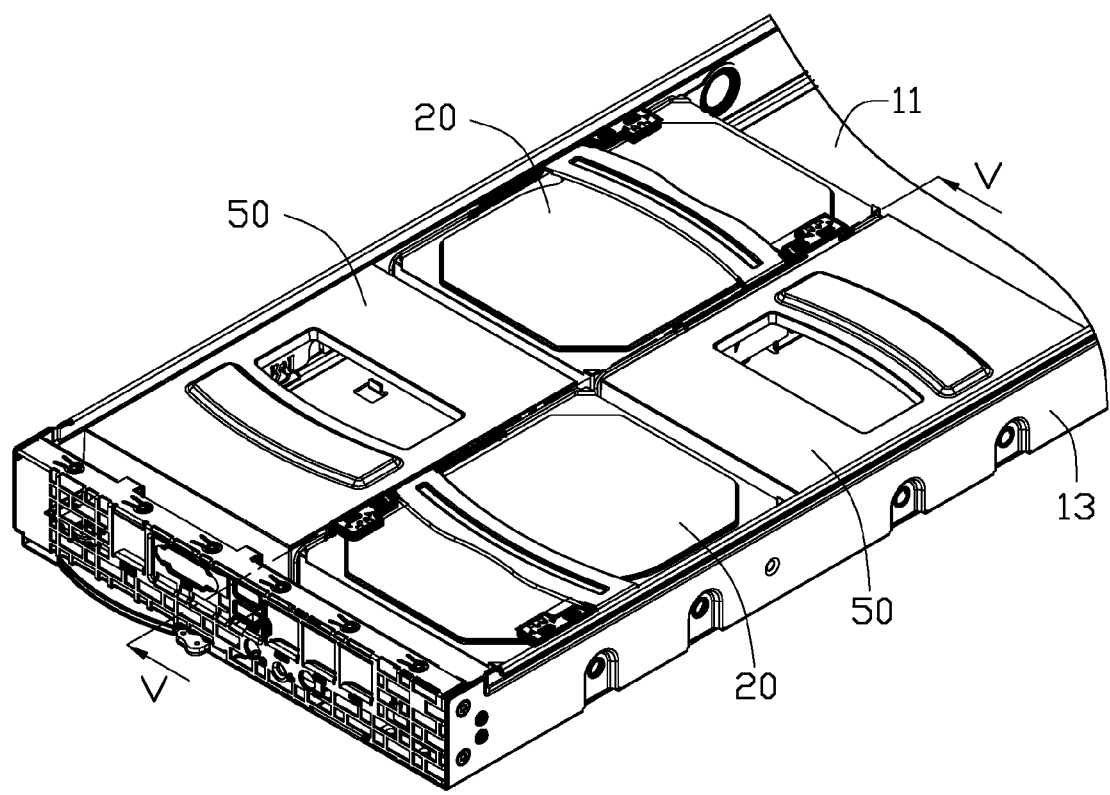
FIG. 4 is an assembled view of the electronic device enclosure and storage devices of FIG. 1.
Figure 5:
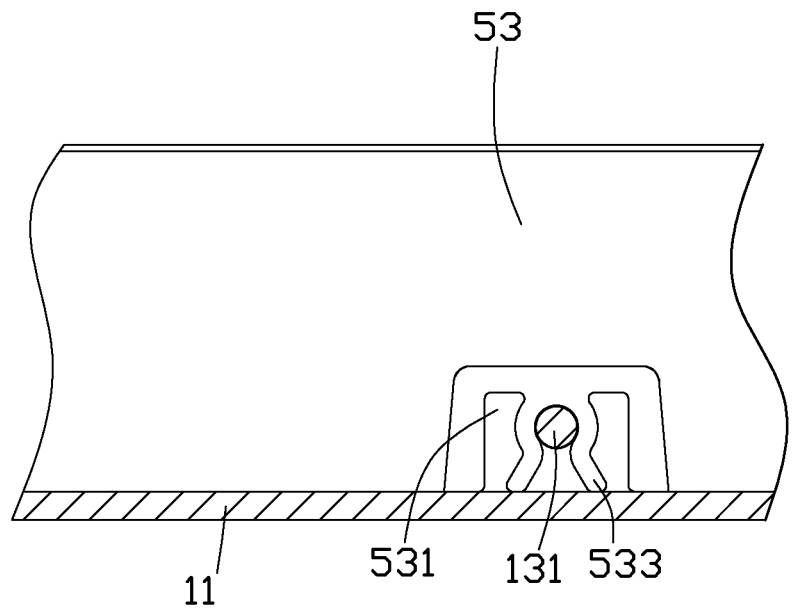
FIG. 5 is a cross-sectional, cutaway view, taken along line V-V of FIG. 4.

Referring to FIG. 2, each of the plurality of covers 50 includes a top wall 51, two sidewalls 53, a front wall 55, and a back wall. The top wall 51 defines an opening 511. Users can conveniently lift up each of the covers 50 via the opening 511. The two sidewalls 53 extend upwards from opposite edges of the top wall 51. The two sidewalls 53 are substantially parallel to each other and perpendicular to the top wall 51. The front wall 55 and the back wall extend upwards from other opposite edges of the top wall 51. Each of the two sidewalls 53 defines two cutouts 531. Two clipping arms 533 are formed on each of the two cutouts 531 and cooperatively define a latching hole 535 corresponding to each of the two fixing posts 131. In one embodiment, the two clipping arms 533 substantially form a U-shape. The latching hole 535 includes a wide portion 5353 and a narrow portion 5351 communicating with the wide portion 5353. A width of the wide portion 5353 is greater than a width of the narrow portion 5351.

When none of the storage device 20 is received in the receiving space 113, one of the covers 50 is put in the empty receiving space 113. This is done by aligning the latching holes 535 with the corresponding fixing posts 131 and pushing down on each of the covers 50 to deform the two clipping arms 533 until the fixing posts 131 extend through the wide portions 5353 to be engaged into the narrow portions 5351. After the fixing posts 131 are engaged, the clipping arms 533 rebound to clip the fixing posts 131. Each of the covers 50 is thereby secured to the chassis 10.

To install the storage device 20 in the receiving space 113 of the chassis 10, an acting force is applied to each of the covers 50 to move each of the covers 50 away from the bottom plate 11 causing the fixing posts 131 to be removed from the narrow portions 5351 to the wide portions 5353. Each of the covers 50 is thereby detached from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An electronic device enclosure comprising:
a chassis, the chassis comprising a fixing post and defining a receiving space configured to receive a storage device; and
a cover, the cover defining a latching hole;
wherein the fixing post is engaged in the latching hole to engage the cover with the chassis, and the cover is configured to engage with the chassis to cover the receiving space when no storage device is received in the receiving space.

2. The electronic device enclosure of claim 1, wherein the latching hole comprises a wide portion and a narrow portion, and the fixing post extends through the wide portion to be engaged in the narrow portion.

3. The electronic device enclosure of claim 2, wherein a width of the wide portion is greater than a width of the narrow portion.

4. The electronic device enclosure of claim 1, wherein the cover comprises two clipping arms, and the two clipping arms cooperatively define the latching hole.

5. The electronic device enclosure of claim 4, wherein the two clipping arms substantially form a U-shape.

6. The electronic device enclosure of claim 4, wherein the two clipping arms are resiliently deformable to disengage the fixing post from the latching hole.

7. An electronic device enclosure comprising:
- a chassis, the chassis comprising a bottom plate, a side plate, and a dividing plate substantially parallel to the side plate; the bottom plate, the side plate and the dividing plate cooperatively defining a receiving space configured to receive a storage device, a fixing post protruding from the side plate and the dividing plate; and
- a cover, the cover defining a latching hole correspondingly located relative to the fixing post;
- wherein the fixing post is engaged in the latching hole to engage the cover with the chassis, and the cover is configured to engage with the chassis to cover the receiving space when no storage device is received in the receiving space.

8. The electronic device enclosure of claim 7, wherein the latching hole comprises a wide portion and a narrow portion, and the fixing post extends through the wide portion to be engaged in the narrow portion.

9. The electronic device enclosure of claim 8, wherein a width of the wide portion is greater than a width of the narrow portion.

10. The electronic device enclosure of claim 7, wherein the cover comprises two clipping arms, and the two clipping arms cooperatively define the latching hole.

11. The electronic device enclosure of claim 10, wherein the two clipping arms are resiliently deformable to disengage the fixing post from the latching hole.

* * * * *